United States Patent [19]

Miwa

[11] Patent Number: 4,885,764

[45] Date of Patent: Dec. 5, 1989

[54] AUTOMATIC ANSWERING TELEPHONE SYSTEM USING MAIN AND AUXILIARY RECORDING MEDIUMS

[75] Inventor: Hirohide Miwa, Kawasaki-shi, Kanagawa-Ken, Japan

[73] Assignee: Tokyo Koshumosu Denki Kabushiki Kaisha

[21] Appl. No.: 101,080

[22] Filed: Sep. 25, 1987

[30] Foreign Application Priority Data

Oct. 1, 1986 [JP] Japan .................................... 234002

[51] Int. Cl.4 ........................................... H04M 1/65
[52] U.S. Cl. ....................................... 379/70; 379/75
[58] Field of Search ................. 379/70, 74, 77, 79–83, 379/75; 369/29

[56] References Cited

U.S. PATENT DOCUMENTS 3,903,368  9/1975  Okamura et al. ...................... 379/79
4,588,857  5/1986  Arsem ..................................... 379/80

Primary Examiner—Alan Faber
Assistant Examiner—James E. Tomassini
Attorney, Agent, or Firm—Murray Schaffer

[57] ABSTRACT

An auxiliary recording medium for recording an incoming message is provided in addition to a main recording medium conventionally provided. Thus, an incoming message is first recorded into the auxiliary recording medium and is then recorded into the main recording medium. At the time of playback, the incoming message which has been recorded into the auxiliary recording medium is first played, and the main recording medium simultaneously rewound. Then, the incoming message recorded on the main recording medium is played.

7 Claims, 3 Drawing Sheets

AUTOMATIC ANSWERING TELEPHONE SYSTEM USING MAIN AND AUXILIARY RECORDING MEDIUMS

PRIOR ART

Various kinds of automatic answering telephone sets have been conventionally proposed and all of them have the following three functions:

(1) Circuit control function to detect a call signal to close a telephone circuit and to open the telephone circuit after use;

(2) To automatically transmit in respose to receipt of an outside call, a message (which hereinafter is called a sending message) such as "please leave message after the beep" tone (hereinafter called the incoming message).

(3) Playback function by which the user of the automatic answering telephone set may either directly, or by remote control, listen to an incoming message recorded during his absence.

In the prior art magnetic tapes of the endless type have been used for storing/reproducing the sending message. In recent years, semiconductor memories have been used as a result of the remarkable progress in the development of microelectronics.

Magnetic tapes of the compact cassette type or the microcassette type have been conventionally used for the incoming message, however, semiconductor memories have been recently used.

Problems with the Prior Art

The problems with the conventional automatic answering telephone set are as follows:

(1) The length of an incoming message is indefinite because of the variety in the business conducted by the many callers and individual variation in the manner of speaking or the like. It is desirable that the capacity of the incoming message recording medium be more than ten minutes in length because of the necessity to record a plurality of incoming messages. Even when an attempt is made to digitalize lengthy voice data, (by using such techniques, as for example, the current adaptive delta PCM, or the like,) and to record such digitalized data, (even if such data is compressed) data quanity reaches 24 to 32 K bit/sec. Accordingly, to ensure that the storage of at least ten minutes capacity is obtained, a semiconductor memory 14.4 to 19.2 mega bits is required. Such a semiconductor memory cannot be economically provided, since commercial semiconductor memories presently available have a capacity of only 10 to 45 seconds.

(2) A compact cassette or a microcassette, available in the market, can be utilized for the incoming message storage media. This is economical, but it is troublesome in operation since, to play back such recorded incoming message, requires means to switch the recording playback drive and head from the recording mode to a rewinding mode and thereafter, to the playback mode.

(3) Since it takes considerable time for the incoming message tape to be rewound so that the stored incoming message can be played back (about 30 to 60 seconds in an ordinary use condition and depending upon a quantity of the incoming messages stored), considerable time is wasted. Where remote control of an automatic answering telephone set is carried out using a remote telephone, the telephone charge thus imposed as a result such wasted time is expensive. In addition, even when an automatic answering telephone set is directly operated, it takes about one minute until a user can listen to the incoming message. Consequently there are instances where some persons would feel psychologically irritated.

OBJECT OF THE INVENTION

An object of the present invention is to solve the problem of shortening the recording time when the incoming message media is a semiconductor memory and to exclude wasted time required for rewinding and playback of a magnetic tape. This makes it possible to immediately playback an incoming message when an automatic answering telephone set is called, or to listen to the stored incoming message.

SUMMARY OF THE INVENTION

An automatic answering telephone set is provided according to the present invention having an auxiliary storage medium for recording incoming messages in addition to the conventionally provided incoming message storage medium. Thus, an incoming message from an outside telephone is first recorded in the auxiliary storage medium and is then stored in the main storage medium. In playing back the recorded messages, the incoming message in the auxiliary storage medium is first played and the main storage medium is rewound during such playback. Then, the incoming message in the main storage medium is played. Thus, the waiting time (wasteful time) from the moment the automatic answering telephone is called to the initiation of playback is avoided, thereby making it possible to listen to the incoming message recorded immediately.

PREFERRED EMBODIMENTS OF THE INVENTION

First Embodiment

Figure 1:
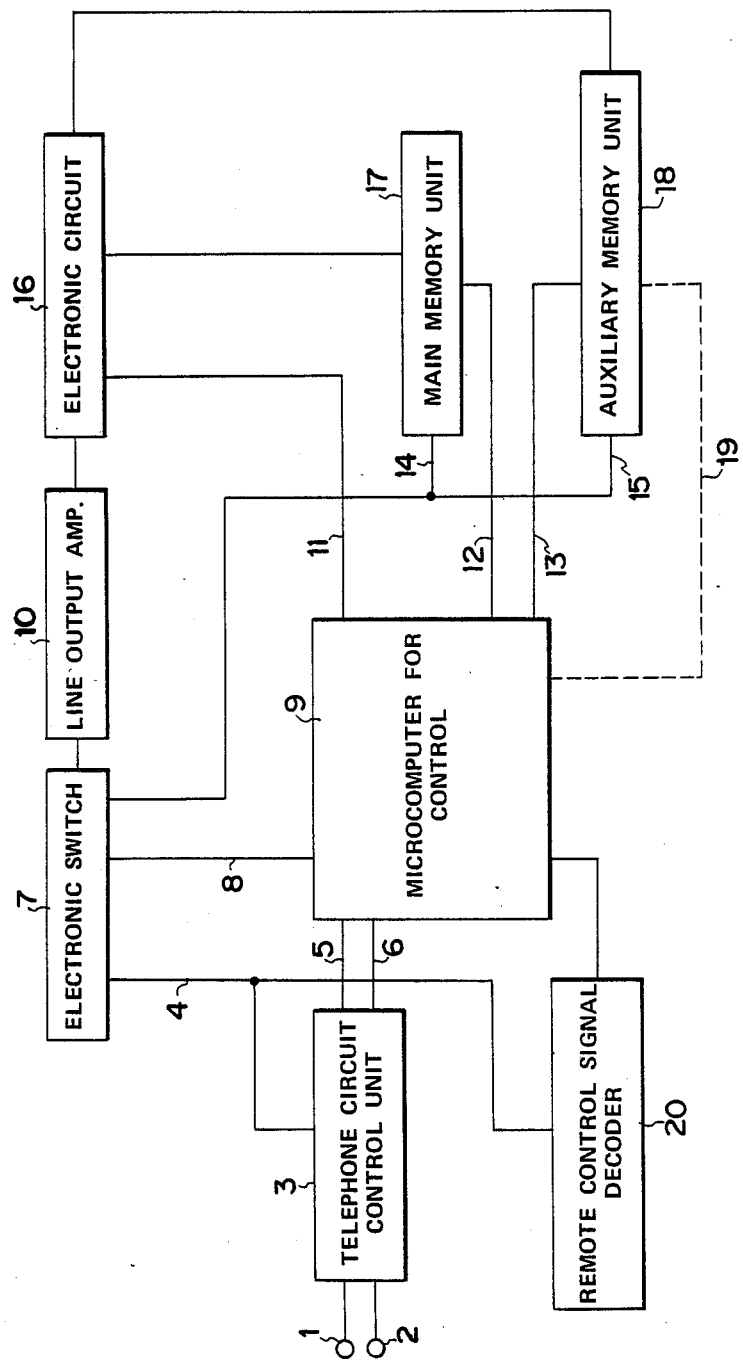
FIGS. 1 to 3 are explanatory views illustrating, in a block form, different embodiments of an automatic answering telephone set according to the present invention.

FIG. 1 is a block diagram showing the principle of an automatic answering telephone according to the present invention. In FIG. 1, an indication of a message transmitting unit is omitted.

In FIG. 1, reference numerals 1 and 2 denote terminals for connecting a telephone circuit thereto, respectively. Reference numeral 3 denotes a telephone circuit control unit, reference numeral 4 a bidirectional voice signal line, reference numeral 5 a calling detection output signal line for the telephone circuit control unit 3, and reference numeral 6 an input signal line for circuit control of the telephone circuit control unit 3.

Reference numeral 7 denotes an electronic switch for effecting switching between recording and playback of an incoming message. Reference numeral 8 is a signal line for controlling the electronic switch 7, reference numeral 9 is a microcomputer for control, and reference numeral 10 is a line output amplifier.

Reference numeral 11 denotes a control signal line for effecting switching of the output of a main storage unit 17 and the output of an auxiliary storage unit 18. Reference numeral 12 denotes a control signal bus for control of the recording/rewinding/playback/starting/stopping and the like of the main storage unit 17.

Reference numeral 13 denotes a control signal bus for the auxiliary storage unit 18, which is similar to the control signal bus for the main storage unit 17.

Reference numerals 14 and 15 denote input signal lines for an incoming message, respectively. Reference numeral 16 denotes an electronic circuit for effecting switching of the output of the auxiliary storage unit 18 and the output of the main storage unit 17, or for allowing the outputs of both storage units 17 and 18 to cross over at the time of playback. Reference numeral 17 denotes the above-mentioned main storage unit provided with a main recording medium, reference numeral 18 denotes the above-mentioned auxiliary storage unit provided with an auxiliary recording medium, reference numeral 19 denotes an address signal bus when a semiconductor memory is used as the auxiliary storage unit 18, and reference numeral 20 denotes a remote control signal decoder.

The main storage unit 17 employed in the present invention uses a magnetic tape of the compact cassette type or the microcassette type, or the like. This main storage unit 17 is constructed so that all the operations for recording/playback/driving/stopping/rewinding of the record medium, movement of the magnetic head, and the like can be electrically controlled by control signals from the microcomputer 9.

The auxiliary storage unit 18 employed in the present invention constitutes a recording medium with a voice analysis/synthesis LSI and a semiconductor memory, or uses a magnetic tape or a magnetic disk of the compact cassette type or the microcassette type, or the endless type in the same manner as in the main storage unit 17. This auxiliary storage unit 18 is also constituted so that all the operations for recording/playback/driving/stopping/rewinding of the recording medium, movement of the magnetic head, and the like can be electrically controlled by control signals from the microcomputer 9.

In this invention, an incoming number discriminator, a counter or an auxiliary recording medium residual or, remaining capacity counter, is reset at the time when playing back an incoming message and listening thereto, or at the time when use of the automatic answering telephone set is initiated. In addition, the program of the microcomputer 9, with regard to the memory of an incoming message, is prepared in advance as follows:

(1) When the residual or remaining capacity of the auxiliary recording medium is above a predetermined capacity, a first incoming message input from an outside caller or incoming messages subsequent thereto is first recorded in the auxiliary recording medium of the auxiliary storage unit 18. On the others hand, when the residual capacity of the auxiliary recording medium is below the predetermined value, the main storage unit 17 is activated to thereby continuously record the subsequent incoming messages onto the main recording medium until the auxiliary recording medium is again provided with a residual capacity that exceeds the predetermined capacity to reach the end of the message.

(2) Where the auxiliary recording medium is a magnetic tape which requires rewinding or an operation similar to rewinding, then the recording of an incoming message shifts to the main storage unit 17, and the auxiliary storage unit 18 is caused to automatically effect an operation such as rewinding, thus placing it in a playback reproducing/standby mode.

(3) When the residual capacity of the auxiliary recording medium is below a predetermined capacity at the time of reception of a new incoming message from an outside telephone, the incoming message is recorded directly from the head portion thereof, into the main recording medium.

Further, the program of the microcomputer 9 when playing back an incoming message is prepared in advance as follows:

(1) When the automatic answering telephone set is subjected to remote control by an external telephone and after a beep tone is sounded subsequent to a sending message, a playback instruction and a secret code may be sent by a DTMF (Dual Tone Multi Frequency) signal etc., from the external telephone. When they are received by the microcomputer 9, via the remote control signal decodere 20, the received code is collated or compared with a secret code stored in advance in the microcomputer 9. As a result, the operation enters into the playback mode. In addition, the telephone unit is manually operated so that it is directly brought into the playback mode. In this case, the incoming messages stored in the auxiliary storage unit 18 is first played back and thereafter the playback is outputted to the telephone circuit via the electronic circuit 16, the line output amplifier 18, the electronic switch 7, and the telephone circuit control unit 3.

(2) During this time period, the main recording medium of the main storage unit 17 is rewound, placing it in playback standby mode. When the playback residual capacity of the auxiliary recording medium reaches a predetermined capacity, or at the time when all playback of the incoming messages recorded on the auxiliary recording medium is completed, the playback of the main storage unit 18 is activated immediately or only after a short time elapse.

(3) When the predetermined recording capacity of the auxiliary recording medium, selected so that it is in correspondence with the time point at which recording by the auxiliary storage unit is switched to record an incoming message on the main recording medium, becomes equal to that in the main storage unit at the time of playback reproduction, then the microcomputer 9 controls the electronic circuit 16, thus activate the main storage unit 17 to play back the incoming message, and simultaneously producing a playback output of the main memory unit 17 to the line output amplifier 10.

(4) In addition, switching of the playback may adopt the system, according to which the playback recording medium is caused to be less than the predetermined residual capacity, thus allowing the microcomputer 9 to control the electronic circuit 16. Thus, at times subsequent to the time of switching of the playback, the playback of the main storage unit 17 is initiated with a signal level produced at the auxiliary storage unit 18, gradually lowering and overlapping with a signal level produced at the main storage unit 17, and its playback signal level is gradually increased. Thus, after the point at which switching of playback is affected, a playback signal from the auxiliary storage unit 18 and a playback signal from the main storage unit 17 are caused to cross over.

Second Embodiment

Figure 2:
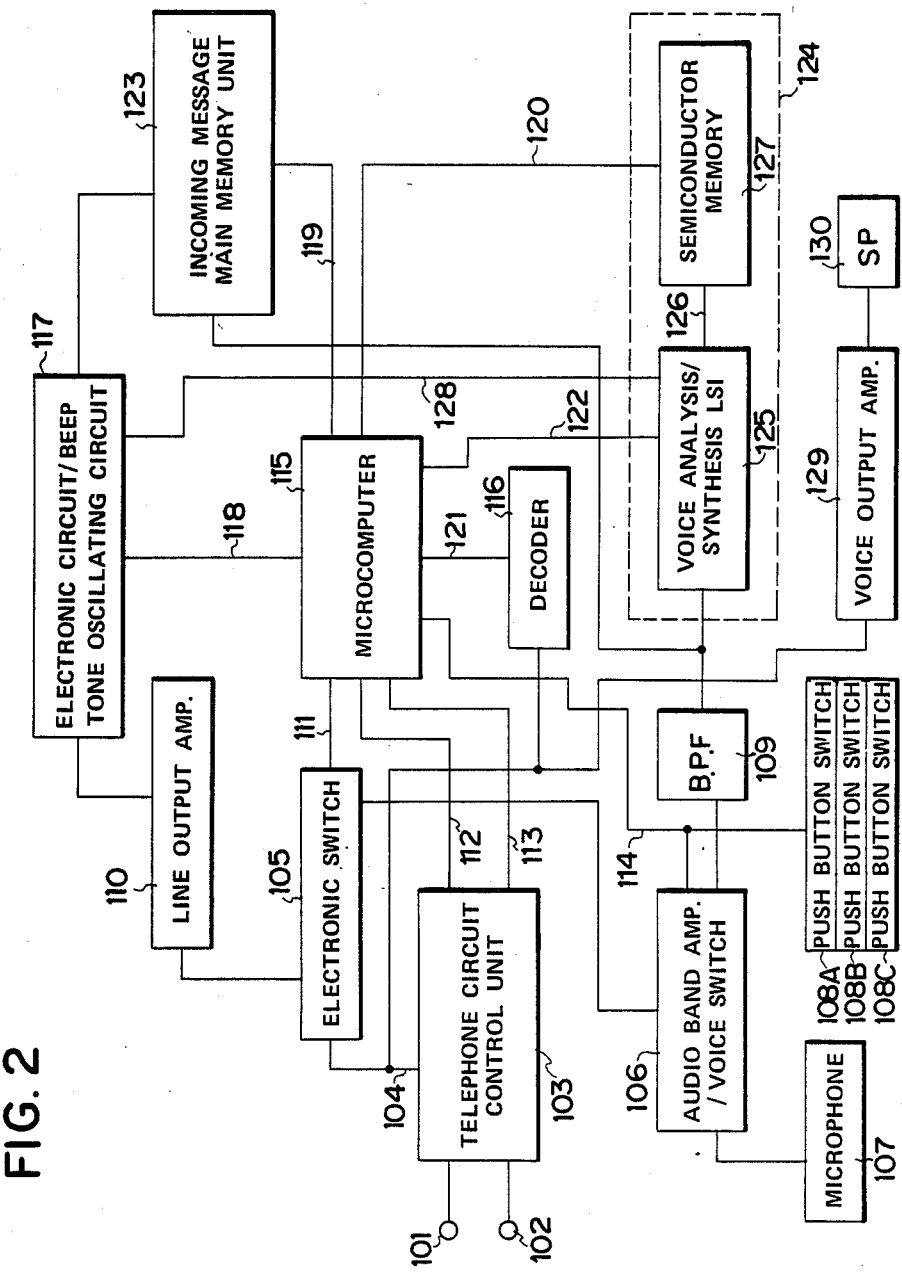

FIG. 2 is a block diagram showing an embodiment in which a semiconductor memory is used as an auxiliary recording medium in an automatic answering telephone set of the present invention.

In FIG. 2, reference numerals 101 and 102 denote terminals to which a telephone circuit is connected, respectively. Reference numeral 103 denotes a telephone cirucit control unit, reference numeral 104 a bi-directional voice signal line, and reference numeral 105 an electronic switch for effecting switching of input/output of a voice signal to the telephone circuit.

Reference numeral 106 denotes an audio band amplifier/voice switch, which is used commonly in recording a sending message and an incoming message. This is an electronic circuit to detect whether or not a voice signal having a level above a certain level continues.

Reference numeral 107 denotes a microphone used to record a sending message. Reference numeral 108A denotes a push-button switch depressed at the time of recording a sending message, reference numeral 108B a push-button switch depressed at the time of playback of an incoming message stored in the associated automataic answering telephone set and reference numeral 108C a push-button switch depressed at the time of selecting the automatic answering mode.

Reference numeral 109 denotes a band pass filter for limiting the audio band, reference numeral 110 a line output amplifier, reference numeral 111 an input/output control signal line, and a reference numeral 112 a call detection signal line.

Reference numeral 113 denotes a circuit control signal used when a microcomputer 115 (to be described later) instructs the telephone circuit control unit 103 to close or open the telephone circuit. Reference numeral 114 denotes a control signal bus for connecting the push-button switches 108A to 108C, the audio band amplifier/voice switch 106 for recording and the microcomputer 115 to each other. Reference numeral 115 denotes the above-mentioned microcomputer, and reference numeral 116 a remote control signal decoder.

Reference numeral 117 denotes an electronic circuit/beep tone oscillating circuit (which corresponds to the electronic circuit 16 in FIG. 1). This circuit is used for switching an input from the line output amplifier 110 to a main storage unit 123 or a semiconductor memory 127 provided in the voice recording and playback circuit 124, or for allowing it to cross over between both memory units 123 and 127.

Reference numeral 118 denotes a control signal line through which a control signal for controlling the electronic circuit/beep tone oscillating circuit 117 is sent from the microcomputer 115.

Reference numeral 119 denotes a control signal bus used for control of recording/playback/starting/stopping/rewinding etc. Reference numeral 120 denotes an address signal bus used for informing the microcomputer 115 of the residual capacity of the auxiliary recording medium provided in the voice recording and playback unit 124. Reference numeral 121 denotes a decoded signal line used for inputting a decoded output from the decoder 116 to the microcomputer 115.

Reference numeral 122 denotes a control signal bus used for sending a control signal to instruct starting/stopping of both storing and reporducing of a sending message, starting/stopping of both recording and playback of an incoming message, and the like from the microcomputer 115 to the voice recording and playback unit 124.

The above-mentioned main storage unit 123 for recording an incoming message, uses a magnetic tape of the compact cassette type or microcassette type as its medium. This storage unit 123 is constructed so that control of the driving/stopping/rewinding/recording and playback of the recording medium or movement of the magnetic tape etc., is electrically executed by control signals from the microcomputer 115.

The above-mentioned voice recording and playback unit 124 corresponds to the auxiliary storage unit 18 in FIG. 1. This unit 124 is used commonly to record and play back a sending message and as an auxiliary recording and playback for an incoming message.

Reference numeral 125 denotes a voice analysis/synthesis LSI, and reference numeral 127 a semiconductor memory (SRAM or DRAM). Reference numeral 126 denotes a bi-directional data line/control signal bus/address bus connecting between the voice analysis/synthesis LSI 125 and the semiconductor memory 127.

Reference numeral 128 denotes a playback output signal line for the voice recording and playback unit 124, reference numeral 129 a voice output amplifier, and reference numeral 130 a speaker.

Memory of a Sending Message

The recording of a sending message in the automatic answering telephone set of FIG. 2 is carried out as follows:

When the push-button switch 108A in FIG. 2 is depressed, the audio band amplifier/voice amplifier/voice switch 106 selects the microphone 107, and at the same time, the microcomputer 115 outputs a control signal to the voice recording and playback unit 124 through the control signal bus 122 so that the voice recording and playback 124 records a sending message. In this condition, by announcing a sending message into the microphone 107, the sending message is recorded into the sending message area of the semiconductor memory 127.

Confirmation of the Sending Message

When the push-button switches 108A and 108B are depressed at the same time in the arrangement of FIG. 2, the voice recording and playback unit 124 is brought into playback state for a sending message. A control is carried out by the microcomputer 115 such that a playback signal is input, without closing the telephone circuit, to the voice output amplifier 129 via the playback output signal line 128, the electronic circuit/beep tone oscillating circuit 117, the line output amplifier 110, and the electronic switch 105, thereby permitting a user to listen to the sending message by making use of the speaker 130.

Operation in the Automatic Answering Mode

When a bell signal is received from the telephone circuit connected to the terminals 101 and 102 in FIG. 2, a calling detection signal is input to the microcomputer 115 via the calling detection signal line 112 by the calling detection circuit provided in the telephone circuit control unit 103. When the calling detection signal occurs for a predetermined number of times, the microcomputer 115 judges that valid reception has been effected to produce a line closing signal in the calling detection signal line 112. Thus allowing the telephone circuit control unit 103 to close the telephone circuit. Simultaneously with this, the microcomputer 115 produces a signal, for switching the electronic switch 105 to the playback mode and a signal for switching the electronic circuit/beep tone oscillating circuit 117 to the side of the voice recording and playback unit 124, in the input/output control signal line 111 and the control signal line 118, reqpectively. Then, the microcomputer 115 places the voice recording and playback unit 124 in the playback state to provide a sending message through the control signal bus 122.

As a result, a sending message recorded in advance in the semicomductor memory 127 is output to the telephone circuit connected to the terminals 101 and 102 via the playback output signal line 128, the electronic circuit/beep-tone oscillating circuit 117, the line output amplifier 110, the electronic switch 105, and the telephone circuit control unit 103.

When the microcomputer 115 receives a signal from the address signal bus 120 to recognize the termination of the sending message, it instructs the electronic circuit/beep tone oscillating circuit 117 to output a beep tone through the control signal line 118. Subsequent to the instruction to output the beep tone, the microcomputer 115 judges the recording or any residual incoming message in the semiconductor memory 127 which is held on a RAM incorporated in the microcomputer 115. When the residual capacity is above a predetermined capacity, the microcomputer 115 instructs the voice recording and playback unit 124 to record the incoming message through the control signal bus 122.

In contrast, when the above-mentioned residual capacity of the memory is below the predetermined capacity, the microcomputer 115 instructs the main storage unit 123 to record the incoming message through the control signal bus 119.

Where storage of the incoming message is initiated on the side of the voice recording and playback unit 124, the microcomputer 115 monitors addresses of the semiconductor memory 127 through the address signal bus 120. When the residual capacity of the semiconductor memory 127 is below the predetermined capacity, the microcomputer 115 instructs the main storage unit 123 to record the incoming message through the control signal bus 119.

When the microcomputer 115 recognizes that the incoming message is soundless for a period more than a predetermined time defined by the voice switch function added to the audio band amplifier/voice switch 106, recording of the incoming message is completed, thus placing the automatic answering telephone arrangement in calling wait condition.

Operation of the Incoming Message Reproducing Mode

The incoming message playback mode is started when the push-button switch 108B is depressed, or when the decoder 116 decodes a remote control signal and a secret code after responding to a call from an external telephone and when a secret code, set in advance in the microcomputer 115, is in correspondence with the secret code decoded by the decoder 116.

When the incoming message playback mode is started, the microcomputer 115 first produces control signals to the input/output control signal line 111 and the control signal line 118 so as to select the playback output of the voice recording and playback unit 124, thereafter provide a control signal to the control signal bus 122 so that the voice recording and playback unit 124 is in the incoming message playback state. Thus, where the playback mode is started by remote control, the output of the incoming message of the voice recording and playback unit 124 is fed to the telephone circuit connected to the terminals 101 and 102 via the output signal line 128, the electronic circuit/beep tone oscillating circuit 117, the line output amplifier 110, the electronic switch 105, and the telephone circuit control unit 103.

Where the playback mode is started by the push-button switch 108B, a control is affected by the microcomputer 115 preventing the telephone circuit control unit 103 from closing and causing the output of the voice recording and playback unit 124 to be fed to the speaker 130 via the output signal line 128, the electronic circuit/beep tone oscillating circuit 117, the line output amplifier 110, the electronic switch 105, and the voice output amplifier 129.

Immediately upon the voice recording and playback unit 124 initiating the playback of the incoming message, the microcomputer 115 outputs a control signal to the bus 119 so that the incoming message memory wait condition of the main storage unit 123 is released and the recording medium of the main storage unit 123 is rewound, resulting in a playback reproducing wait condition.

After the playback of the incoming message is initiated in the voice recording and playback unit 124, the microcomputer 115 monitors addresses at which the semiconductor memory 127 is accessed to start playback of the main memory unit 123 when the residual capacity of the incoming message recording medium is below a predetermined capacity.

At this time, the electronic circuit/beep tone oscillating circuit 117 is controlled by the microcomputer 115 so that it switches the incoming message playback signal input to the line output amplifier 110 from the voice recording and playback unit 124 to the main storage unit 123, or it gradually increases the level of the playback signal from the main storage unit 123 while gradually reducing the level of the playback signal from the voice recording and playback unit 124, thus allowing the playback signals from both storage units to cross over.

Return to the Automatic Answering Mode

When playback of all of the recorded incoming messages is completed, the microcomputer 115 executes all processing required to returning to the automatic answering mode.

Even when playback of all recorded incoming messages is not completed, when the decoder 116 decodes a playback stop signal, or when the push-button switch 108C is depressed, the microcomputer 115 momentarily interrupts the playback of the incoming message and executes all processing required for returning to the automatic answering mode.

Third Embodiment

Figure 3:
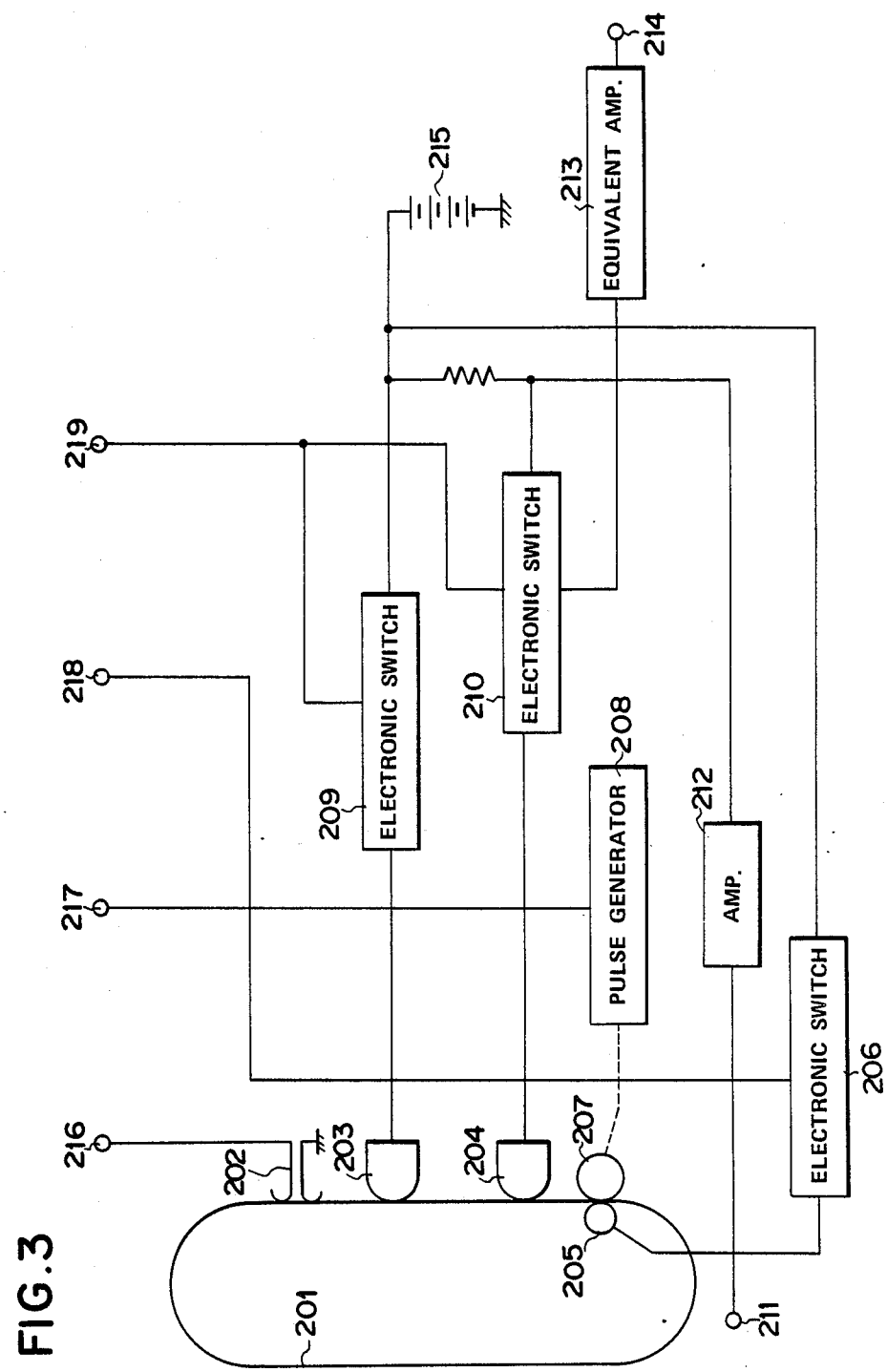

FIG. 3 shows a further embdiment of an automatic answering telephone set according to the present invention wherein a magnetic tape is used instead of the semiconductor memory as the auxiliary recording medium. In this embodiment, a new cassette tape etc., may be independently provided as the auxiliary recording medium, but it is possible to commonly use the cassette tape for storing a sending message for this purpose. FIG. 3 shows the example of such a common use and is a block diagram mainly illustrating the auxiliary storage unit of the automatic answering telephone set.

In FIG. 3, reference numeral 201 denotes a magnetic tape of the endless type in which a metal leaf sensor is attached to the joining portion. Reference numeral 202 is a sensing post, reference numeral 203 is a magnetic erasing head, reference numeral 204 is a recording and playback magnetic head, reference numeral 205 is a direct drive type electric motor, a capstan, and reference numeral 206 is an electronic switch for starting and stopping the electric motor 205.

Reference numeral 207 denotes a pinch roller for pressing the tape onto the capstan 205, and reference numeral 208 a pulse generator which generates a pulse corresponding to the rotation of the pinch roller 207 in order to input addresses of the memory medium to the microcomputer.

Reference numeral 209 denotes an electronic switch which effects on/off of an erasing current caused to flow in the erasing head 203. Reference numeral 210 denotes an electronic switch for effecting switching of recording and playback, reference numeral 211 an input terminal for a voice signal for memory, and reference numeral 212 an amplifier for allowing a memory current to flow in the recording/playback magnetic head 204.

Reference numeral 213 denotes an equivalent amplifier for a signal playback by recording/playback magnetic head 204. Reference numeral 214 denotes an output terminal for a playback signal, reference numeral 215 a dc power source, reference numeral 216 an output terminal for a signal to inform the microcomputer of zero-th address of the recording medium, reference numeral 217 an output terminal of the pulse generator 208, reference numeral 218 a terminal for a signal to control the electronic switch 206 provided for control of the drive 205 of the recording medium, and reference numeral 219 a terminal for a signal which controls recording and playback operation.

The output terminals 216, 217 and 219 in FIG. 3 are indicated collectively as the control signal bus 122 in FIG. 2. The terminal 218 in FIG. 3 corresponds to the address signal bus 120 in FIG. 2.

The magnetic tape 201 may have a memory capacity of about one to two minutes in terms of time is used. A portion corresponding to about 15 to 30 seconds from the sensing leaf (zero-th address) of the tape 201 is assigned to the sending message area, and the remaining portion is used as an auxiliary storage area for recording an incoming message.

A control is effected by the microcomputer such that at the calling wait time in the automatic answering mode, the zero-th address of the magnetic tape 201 is always stopped at the position of the recording and playback magnetic head 204.

When the residual capacity of the auxiliary storage area of the magnetic tape 201 is 100%, i.e., an incoming message is given at the beginning after reset, the incoming message is recorded subsequent to the sending message. The software of the microcomputer is prepared so that where a suitable capacity remains in the auxiliary storage area when a second incoming message after reset and those subsequent thereto are given, after the sending message is completed, fast-feeding is conducted to the head portion of a vacant area of the auxiliary storage area to output a beep tone. Thus, the automatic answering telephone set in the third embodiment can provide a function equivalent to the function of the second embodiment.

In the case of playback of the incoming message stored in the auxiliary storage area, when the automatic answering telephone set is started directly by the push-button switch 108B in FIG. 2 or by a remote control, a control capable of fast-feeding the sending message portion or the remaining portion thereof may be conducted.

Advantages with the Invention

The advantages with the automatic answering telephone set according to the present invention are as follows.

(1) The telephone answering arrangement is devised so that an incoming message recorded in the auxiliary storage medium is first played back while the main recording medium is rewound. Then a incoming message recorded in the main memory medium is played back. Thus, when playing the incoming message and listening thereto, it is possible to instantaneously listen to the incoming message without requiring a wasteful waiting time. For this reason, a user does not feel irritated and costly telephone charge can be saved when reproducing incoming message by remote control.

(2) Since the contents of the auxiliary recording medium can be played back subsequently to the sending message or instantaneously as long as at least one incoming message is recorded in the auxiliary recording medium, even if incoming messages recorded are many or less, a user can instantaneously listen to a desired incoming message without requiring a wasteful waiting time.

(3) Since an incoming message recorded in the main recording medium is automatically played back without interruption subsequent to the playing of the incoming message stored in the auxiliary recording medium, this automatic answering system is convenient in that no switching operation, etc., is required.

I claim:

1. An automatic answering telephone system having a main recording medium having a waiting period when shifted between the recording state to the playback state during receipt of and subsequent playback of messages comprising an auxiliary recording medium in addition to said main recording medium, control means adapted to conduct incoming message/messages from an incoming telephone line for storage first in said auxiliary recording medium and then any subsequent incoming message/messages in said main recording medium, and means for first playing back the incoming message/messages recorded in said auxiliary storage medium while rewinding said main recording medium during playback of said auxiliary recording medium, and thereafter playing back said main recording medium.

2. The automatic answering system according to claim 1, including means for playing back said incoming message/messages as recorded in said main recording medium substantially immediately following the completion of the playback of the incoming message/messages as recorded in said auxiliary recording medium.

3. The automatic answering system according to claim 1, including means for playing back said incoming message/messages in such a manner that said incoming message/messages recorded in said main recording medium continues for a while after a time point a little before completion of the playback of the incoming message/messages on said auxiliary recording medium, thus allowing the playback of incoming message/messages on both recording media for a while during the cross over of playback of incoming message/messages from the auxiliary recording medium to the main recording medium.

4. The automatic answering system according to claim 1, wherein at a time point when residual capacity in said auxiliary recording medium reaches a predetermined level, or after completion of the playback of said incoming message/messages recorded in said auxiliary recording medium after said time point, the incoming message recorded in said main recording medium is played back.

5. The automatic answering system according to claim 1, wherein where said auxiliary recording unit is a magnetic tape, a magnetic sheet, or the like, and when recording of said incoming message/messages shifts from said auxiliary storage unit to said main recording medium, said auxiliary recording medium is caused to be brought into playback initiating wait mode.

6. The automatic answering system according to claim 1, wherein an auxiliary recording area for recording incoming message/messages is provided in a portion of a outgoing message recording medium.

7. The automatic answering system according to claim 1, wherein the playback time of said auxiliary recording medium is set so that it is equal to or nearly equal to the delay time from the time when said main recording medium is rewound to the time when said main recording medium is brought into playback position.

* * * * *